United States Patent

[11] 3,595,986

| [72] | Inventor | Hans-Wolfgang Rathje<br>Pullach, Isartal, Germany |
|---|---|---|
| [21] | Appl. No. | 860,331 |
| [22] | Filed | Sept. 23, 1969 |
| [45] | Patented | July 27, 1971 |
| [73] | Assignee | Siemens Aktiengesellschaft<br>Munich, Germany |
| [32] | Priority | Oct. 1, 1968 |
| [33] | | Germany |
| [31] | | P 18 00 335.5 |

[54] CENTRAL AUTOMATIC CHARGE DETERMINATION IN TELETYPEWRITER EXCHANGE SYSTEM
10 Claims, 1 Drawing Fig.

[52] U.S. Cl. .................................. 178/2 F, 179/7 MM
[51] Int. Cl. ...................................... H04l 11/00
[50] Field of Search .......................... 178/2 F; 179/7 MM, 7.1 R, 7.1 TP

[56] References Cited
UNITED STATES PATENTS
| 3,423,519 | 1/1969 | Radler | 178/2 F |
| 2,397,553 | 4/1946 | Light | 178/2 F |
| 2,235,006 | 3/1941 | Barth | 178/2 F |

Primary Examiner—Kathleen H. Claffy
Assistant Examiner—Tom D'Amico
Attorney—Irons, Birch, Swindler & McKie ABSTRACT: Automatic determination of information concerning long distance communication connections, such as in a teletypewriter exchange system. An input store is seized by auxiliary equipment associated with a seized line circuit, upon initiation of a call, and information concerning the connection is transmitted to the input store and from there to a common intermediate store. Upon completion of the connection, the input store is disconnected, but charge information is automatically accumulated in the intermediate store until the end-of-connection signal is received, whereupon the charge information in the intermediate store is read into a common main store.

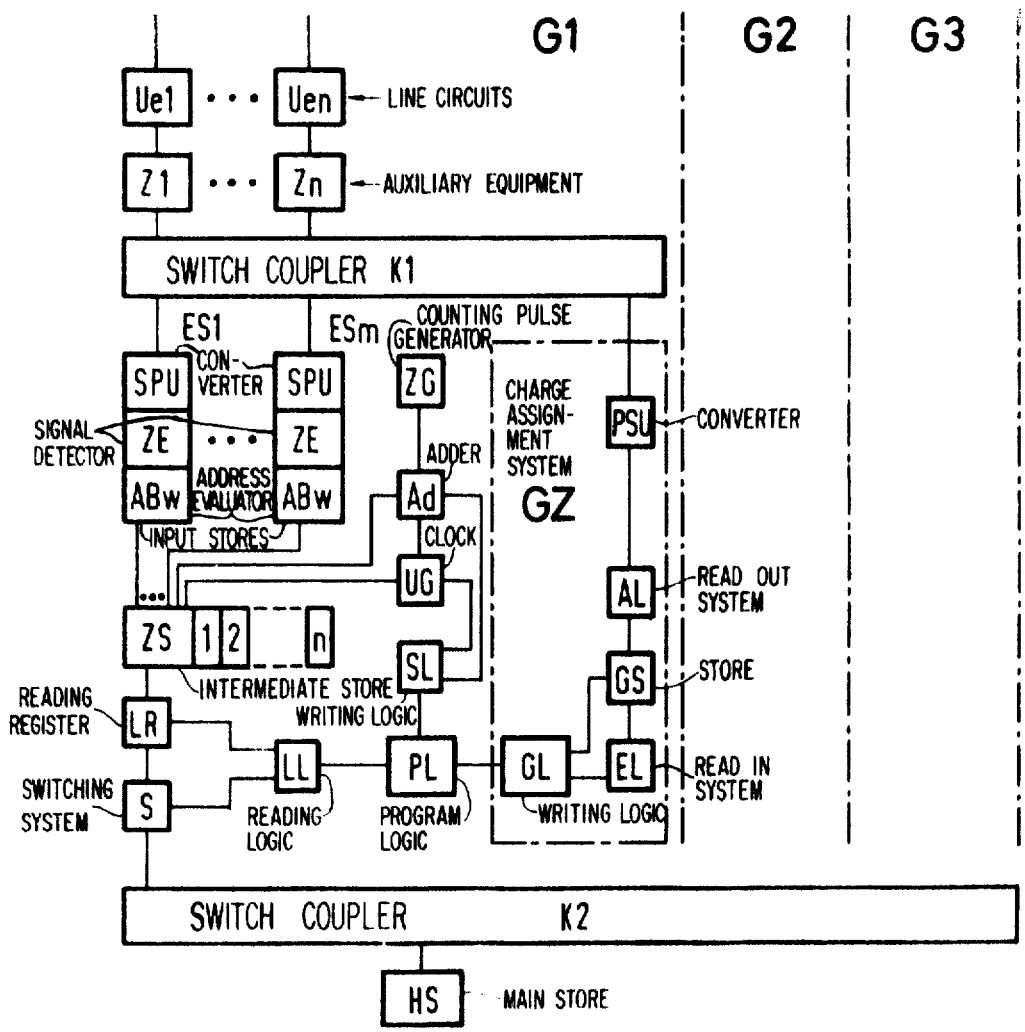

3,595,986

CENTRAL AUTOMATIC CHARGE DETERMINATION IN TELETYPEWRITER EXCHANGE SYSTEM

GENERAL DESCRIPTION

The invention concerns a process for the automatic determination of information necessary for the evaluation of connections, for long distance communication systems, in particular teletypewriter dialing exchange installations, as well as a system to carry out this process, the process utilizes an intermediate store connectable to the connection or circuit only at the beginning and at the end of a connection.

It is known in the exchange art to collect at a central location the information necessary for the evaluation of a connection and to make available, in a given case, a readable charge report, separately for each connection. In such a system the circuit charge determination system is employed throughout the duration of the circuit connection. For determination of the zone, the system receives the identification numbers of the calling and of the called subscriber. For the duration of the connection, the system is supplied with synchronizing pulses. The number of the pulses, together with identification of the zone, permits an evaluation to be made according to the time zone principle. Disadvantages of such a system are that the central charge determination system is occupied for the entire duration of a connection, and that in order for the charge for the connection to be determined, a time zone calculation must first be performed.

There has already been suggested a process for the central determination and evaluation of charges in teletype installations by which these disadvantages are avoided. In this suggested process, each subscriber station is provided with an identifying code emitting information identifying the subscriber station, which can be caused to emit the identification, over a special information conductor, by the central charge determination system. To determine the information identifying the called subscriber, there is provided a calling number store which receives the dialed digits and which conveys them as parallel combinations to a central identification matrix, from where the information reaches a store. The identifying code of the calling subscriber is handled in the same way. The information accumulated at the initiation of the connection is recorded, together with additional information characterizing this connection, so that information about the point in time at which the connection is ended can be added. The connection of the storage means of the central charge determination system to a connection can thereby be restricted to a connection at the beginning and at the end of a connection. The storage means is available to other connections for the duration of the connection.

However, it is considered a disadvantage that special identification codes have to be assigned to the subscribers, which codes must be controlled over a special information conductor, and that an additional identification matrix must be available to receive the identification of the subscribers. In the case of this known suggestion the zone and the points in time of the beginning and the end of the connection are available for the evaluation of the connection. If a subscriber requests charges at the end of the connection, then the charge must be determined from the available data, prior to the release of the connection to the calling subscriber. This type of charge determination is particularly not suited for fast-working teletype exchange installations.

The invention described in the following also concerns a precess for the automatic determination of information necessary to evaluate connections, utilizing an intermediate storage means connectable to the connection only at the beginning and at the end of a connection. Its task is to avoid the above-mentioned disadvantages. The process according to the invention is characterized by the fact that the intermediate storage means, upon the seizing of a connection set within the connection establishment, for example a line circuit, is controllable over an input store through the address of auxiliary equipment assigned to each connection set; that during a first phase beginning with the point in time of the seizure of a connection set, the information accumulating at the beginning of the connection (address of the seized connection set, time of seizure, identity of the calling and called subscribers) reach the specified place of the intermediate store assigned to the seized connection set; that during a second phase, beginning with the completion of the connection to the called subscriber, the input store is released; that during the first phase the intermediate store receives, over a clock mechanism, information about the time of seizure, and during the first and second phases, over a central counting pulse generator and a central adding system, direct informations about the duration of the first and second phase (switching and exchange duration); and that during a third phase, beginning with the end signal, the input store is again seized over the auxiliary equipment, the information input concerning time duration is disconnected and there is caused the emission as signals, of all information contained at the intermediate store location assigned to the seized connection.

Within the framework of the invention, the identification of the subscribers takes place over a register of the exchange office which, after the seizure of an input store, is caused either to emit a request to release transmission of textual identification by the calling subscriber, or the transmission of an identification through the exchange office.

The process of the invention also makes it possible for the subscriber to receive information of interest to him concerning a connection, simultaneously with the issuance of the information from the intermediate store into the main store. This can be accomplished by use of a charge assignment signal which is recognizable in the auxiliary equipment, to cause the information to reach a storage means in a charge assignment system. Then, through comparison of the address assigned to this information with the address of the auxiliary equipment, which is again connected by reason of recognition of the end-of-connection signal, a connection is established to the seized connection set and the desired information can be transmitted to the subscriber over this connection.

According to a further feature of the invention development, a delay line or transit time storage is used as the intermediate store, and the data signals of the information which accrues for each connection are stored in individual storage areas thereof, which are in each case fixedly or variably assigned to a connection set.

It is an advantage of the process according to the invention that the intermediate store contains separate information about the duration of the exchange process (first phase) and about the duration of the circuit connection (second phase).

To control the input, or output of information into, or out of the intermediate store, a program logic is available which becomes effective upon the seizure of a line circuit.

DETAILED DESCRIPTION

The mode of operation of central charge determination in accordance with the process of the invention is described in the following with the aid of the accompanying drawing, showing in block form an embodiment of the invention. In this example, the connection sets lying within the connection arrangement shown are the line circuits in the exchange station. However, the invention is not limited to this working example.

In the drawing $n$ line circuits $Ue1$ to $Uen$ of an exchange office form each of a number of groups G1, G2, G3, etc. of which, however, only the first group G1 is shown in detail. An auxiliary equipment Z1 to Zn is assigned to each line circuit. These are connectable over a first switch coupler K1 to $m$ input stores ES1 to ES$m$ ($m<n$). Each input store contains essentially a series parallel converter SPU, a system for signal detection ZE and an address evaluator system ABw, which will be discussed later. There is further available a common intermediate store ZS for a group of line circuits, which receives the information offered by the line circuits over the input stores, but at the same time also information which accumulates within the central charge determination installation, as for example, time and counting pulses. Over a reading register LR and a switching system S the intermediate store ZS is connectable over a second switch coupler K2, to a main store HS, common to a series of groups, from which the information can be removed for later data processing or for evaluation for statistical purposes. The number of main stores depends on the receiving capacity and recording speed. The shown example possesses only one main store HS.

A charge assignment system designated GZ contains a further store GS which on the one hand receives, over a read in system EL, the data of interest to the subscriber, and which on the other hand, is connectable to the appropriate seized line circuit over a readout system AL, a parallel-series converter PSU and the first switch coupler K1. The program logic which is available to control the input, or output of information into, or out of intermediate store ZS is designated PL. It takes over, together with a writing logic SL, the adaptation of the mode of operation of the input stores and of the intermediate store. The information present in an input store, as well as the time and the counting pulses for the measurement of time, are properly taken over into the intermediate store over the program and the writing logic. Together with a reading logic LL, the program logic PL also controls the issuance of the information out of the intermediate store. Finally, the program logic PL, together with a writing logic for charge assignment GL, also takes over the control of the charge assignment process.

The mode of operation of the central automatic charge determination shown in the drawing is as follows: After the seizure of a line circuit, for example U*el* , an input store is requested, over the associated auxiliary equipment Z1, over coupler K1. If, for example, input store ES1 has been connected, the through connection is acknowledged by coupler K1, which leads the auxiliary equipment Z1 to issue its address, which is converted in address evaluator AB*w* of input store ES1 into a form suited for the intermediate storage means. The storage area in intermediate store ZS, which is assigned to line circuit U*el*, is approachable over this address. Over the program logic PL, activated upon the seizure of line circuit U*el*, the measurement of time of the first phase (switching duration) is initiated. This takes place in such a manner that the adder A*d* receives from a counting pulse generator ZG the command to count up a time unit in all areas of the intermediate store ZS, seized by the first or second phase. This command reaches program logic PL which connects all areas in which the exchange or connection signal is present, by connecting the writing logic SL, with adder A*d*, and which increases the count by one unit. At the same time the time is also included over the clock mechanism UG. Finally, the identity of the calling subscriber is requested by program logic PL. Also, upon the acknowledgement of the seizure of the input store ES1, a textual notification had been sent from a register to the calling subscriber, causing his teletypewriter to be connected and to emit the textual name thereof. This arrives at input store ES1 and is evaluated in the signal detector designated ZE. The information determined therefrom about the calling subscriber is entered into the intermediate store ZS in the location provided therefor. The thereafter-following dial information also arrives, over the already described path, at the intermediate store, where it is also stored in the location provided therefor. The dial end signal is recognized in signal detector ZE of the input store and also recorded in the intermediate store.

It is also possible within the framework of the invention to carry out the subscriber identification automatically be a register which requests identifying information from the end exchange station.

Simultaneously with the storage of the dial information, the connection to the called subscriber is established over the exchange station, not shown here. If the called subscriber is not busy, the so-called through-connection signal (D-signal) arrives in auxiliary equipment Z1, where it is recognized and transmitted, over input store ES1, into intermediate store ZS. Through this signal, program logic PL is caused to terminate the measurement of time of the first phase (switching duration), and to initiate the measurement of time of the second phase (connection duration). Finally input store ES1 is also switched free through this signal.

As the systems available for signal detection in the auxiliary equipment and in the input store are connected until the evaluation of the through-connection signal (*d* signal), all kinds of operational cases can be evaluated. If the called subscriber is for example occupied, the busy-signal, the so-called B-signal is recognized and stored in the intermediate store. This also terminates the measurement of time of the first phase, over the program logic. At the same time the reading out of the already accumulated information from the intermediate store into the main store is initiated thereby and the input store switched free again.

The same program is also initiated through the detection of a fault signal.

After a connection has been established, i.e., the through-connection signal has been recognized and evaluated, the input store ES1 is switched free through switch coupler K1 and is thereby again available for another line circuit. The time impulses accumulated during the connection are taken into intermediate store ZS over adder A*d*. Again, if to adder A*d* a command to count up a time unit is given by counting pulse generator ZG, the areas of the intermediate store ZS in which the through-connection signal is present, are connected, under control of the program logic PL, with the adder A*d*, and the calculation increased by one unit. This process proceeds independently of the further tasks of the storage means.

After the termination of the teletypewriter connection, the end signal sent by a subscriber is recognized in auxiliary equipment Z1 and an input store is again seized over switch coupler K1. Subsequently, the address of the auxiliary equipment Z1 is transmitted to the input store and from there into the intermediate store. At the same time, through the end signal, the program logic PL is also caused to terminate the measurement of the time of the second phase (connection duration) and to begin the reading-out process from the intermediate store into the main store. For this purpose, the address of the auxiliary equipment and a reading command are conveyed to reading logic LL, which requests the main store HS over the second switch coupler K2. After the acknowledgement of the seizure of main store HS, the information for this connection, contained in the intermediate store, is taken into the reading register LR and from there given into the main store. The information contained in the intermediate store ZS at the place assigned to the seized line circuit is thereby taken over in the form of signals into the main store HS.

It is possible within the framework of the invention to furnish to the calling subscriber at the end of a connection the data of interest to him (date, time, duration of the connection) regarding the connection. Charge assignment system GZ is available for this purpose. It is connectable to the reading register LR, over switching system S, which is controllable over reading logic LL. A charge assignment signal has already been recognized at the beginning of the connection, for example with the dial end signal, in signal detector ZE, and has been registered in the known manner into intermediate store ZS at the beginning of the connection. If, for example, line circuit U*el* has been seized, this special assignment signal is also simultaneously stored in the auxiliary equipment Z1, which has the result that upon the arrival of the end signal, the connection to the calling subscriber is held, and a connection is requested over the first switch coupler K1 to the charge assignment system GZ. If reading logic LL is caused, over the program logic PL, to read out information which possesses an assignment signal, then switching system S is controlled in such a way that the information read out over reading register LR reaches the main store as well as store GS of the charge assignment system GZ over the reading-in system EL. After this store GS has taken over the data of interest to the subscriber, then over charge assignment logic GL, the reading-out process is started over reading-out system AL, whereby the address of the connected line circuit U*el* is available. Already with the arrival of the end signal the auxiliary equipment had requested a connection over the first coupler K1 to charge assignment system GZ, and after the seizure of the charge assignment system, had received from there the request to transmit the address of auxiliary equipment Z1. Through address comparison which is carried out by the charge assignment logic GL, the information destined for the requesting auxiliary equipment is found and assigned, over the through-connected coupler K1, to auxiliary equipment Z1 and thereby to line circuit U*e*. From there this information reaches the calling subscriber. After the completion of the assignment, the charge assignment logic GL releases the connection to the subscriber, cancels the address and disconnects itself.

The invention has been explained with an example wherein $n$ line circuits form a group to which in turn $m$ input stores ($m<n$) and one intermediate store are assigned. If, as suggested within the framework of the invention, a circulating transit time store, such as a delay line, is used for intermediate storage, then the number of line circuits combined into a group can be increased, through enlargement of the storage capacity of the transit time store, whereby it is basically unimportant whether a transit time store with serial or with parallel storage is used. If the intermediate store consists, for example, of three transit time stores, connected in series, the number of line circuits also increases to $3 \cdot n$. The number of input stores then increases according to statistical traffic calculations. The arrangement for the central determination of information evaluating connections according to the invention can accordingly be broadened in simple manner.

It is also possible within the framework of the invention to permit access to the charge determination system only be those line circuits whose evaluation is of interest. It is of advantage thereby that the formation of groups is independent from exchange office grouping.

The storage area fixedly available in the intermediate store for one line circuit in each case can receive so much information that, in addition to the numbers of the calling and the called subscriber, the date, the time of the call, the duration of the switching process and of the connection, still further criteria for switching, reading, busy, fault, charge assignment and address of the connection set can be recorded. Thereby not only the evaluation of a connection, but also the statistical evaluation of connections is possible.

To adapt the automatic charge determination system to different codes, one only need adapt the storage capacity of the transit time store to the number of the steps determined by the code. Though this adaptation is basically possible in the case of transit time stores with series as well as with special advantages. As therein the recording of the information takes place by signals, whereby each step of a signal is written onto a storage wire of the transit time store, only the number of storage wires is then to be adapted corresponding to the selected code. Thus the arrangement operates independently of the code.

Due to the high synchronizing frequency by which a transit time store can be operated, signals which are present at the output of the input store for a period longer than one circulation period of the transit time store, can be stored. This means that the system is also adaptable with regard to the speed.

Over the second switch coupler K2 each of a group of intermediate stores are connectable to one or to several main stores. As the reading register makes available as signals the information to be read out to be conveyed to the main store, the readout speed is only determined by the circulation period of the transit time storage. For this reason as main store, any store with a reading speed that is slower than the reading-out speed with which the reading register makes available the signals, can be used.

I claim:

1. Process for the automatic determination of information necessary for evaluation of connections in a teletypewriter exchange system, in which the information is stored in an intermediate store which is connected to the connection only at the beginning and the end of each connection including the steps of controlling the intermediate store by an input store when a connection set is seized by calling subscriber, supplying to a specified location in the intermediate store assigned to the seized connection set during a first phase, beginning in time with the seizure of the connection set and ending with the completion of the connection to the called subscriber, the information accruing at the beginning of a connection, including the address of the seized connection set, the time of seizure thereof, and the identity of the calling and called subscribers, disconnecting the input store from the connection during a second phase beginning in time with the completion of the connection to the called subscriber and ending with the end of the connection, supplying to said specified location of the intermediate store during both said first and second phase information reflecting the durations thereof, and, during a third phase beginning with the end of the connection, seizing an input store, stopping the supply of information to the intermediate store concerning the duration of the first and second phases, and transmitting all of the information in said specified location of the intermediate store to a main store.

2. The method of claim 1 in which the identification of the subscribers is supplied as one of the textual identification and a code identification, upon seizure of an input store.

3. The method of claim 1 including the steps of responding to a charge assignment signal by transmitting charge information to the calling subscriber simultaneously with transmission of the information from the intermediate store to the main store, and determining the information to be transmitted to the calling subscriber by comparison of the address assigned to this information with the address received by seizure of the input store at the beginning of said third phase.

4. In apparatus for automatic determination of information necessary for evaluation of connections in a teletypewriter exchange system including a group of connection sets each available for seizure by a calling subscriber and an intermediate store for storing said information in specified locations respectively assigned to the seized connection sets, the intermediate store being connected to the connection to the calling subscriber only at the beginning and at the end of each connection, in which the improvement comprises a plurality of auxiliary equipments (Z1 to Z*n*) each connected to a different one of said connection sets (U*el* to U*en*)

a plurality of input stores (ES1 to ES*m*) each available for seizure by a connection, a first switch coupler (K1) having said auxiliary equipments and said input stores connected thereto and operable to connect on available input store to the auxiliary equipment of a seized connection set, said input stores each including means (AB*w*) for evaluating the address of the auxiliary equipment to which it is connected by said coupler to cause transmission of information concerning the connection involving that auxiliary equipment to the proper location in said intermediate store, the connection sets being arranged in groups and there being an intermediate store for each said group, a main store common to a number of said intermediate stores, means (LR, S, K2) for transmitting information concerning a connection stored in said intermediate store, to said main store after the connection is ended, and means (SL, PL, UG, A*d*, ZG) for supplying information concerning the connection to the intermediate store connected to said connection while the connection is being established and thereafter until the connection is ended.

5. The apparatus of claim 4 including means (GZ) for transmitting charge information to the calling subscriber from the intermediate store simultaneously with transmission of information from the intermediate store to the main store.

6. The apparatus of claim 5 in which said last-named transmitting means includes a charge assignment store (GS), a read-in system (EL) connected between said intermediate store and said charge assignment store, for reading into the charge assignment store charge information read out from the intermediate store, a readout system (AL) connected between the charge assignment store and said first coupler for reading out to the subscriber charge information recorded in the charge assignment store, program logic means (PL) for controlling read-in and readout of information into and from the intermediate store, respectively, and charge assignment logic means (GL) controlled by the program logic means for controlling read-in and readout of information into and from the charge assignment store.

7. The apparatus of claim 4 in which said supplying means includes a clock (UG) for supplying the time of initiation of a connection, a counting pulse generator (ZG) for supplying timing pulses, an adder (Ad) connected to said generator and operable when connected to said intermediate register to increase the count represehting time duration therein as timing pulses are received from said generator, program logic means (PL) for controlling read-in and readout of information into and from the intermediate store, respectively, and writing logic means (SL) controlled by said program logic means for connecting said clock and said adder to said intermediate store to record the time of connection and the duration of connection therein in locations assigned to seized connection sets.

8. The apparatus of claim 7 in which said writing logic means causes connection of said adder to all locations in said intermediate store assigned to a seized connection set from the initial seizure thereof until the end of the connection initiated thereby.

9. The apparatus of claim 4 in which said intermediate store is a delay line storage device having a number of storage locations respectively assigned to seized connection sets and wherein the charge data for each connection are always stored in the same location, and said program logic means and writing logic means are operable to control the location in which charge information is stored in said intermediate register.

10. The apparatus of claim 9 in which said intermediate store includes a plurality of delay lines connected in one of series and parallel.